US010972929B2

(12) United States Patent
Yum et al.

(10) Patent No.: US 10,972,929 B2
(45) Date of Patent: Apr. 6, 2021

(54) CHANNEL STATE REPORTING METHOD IN WIRELESS COMMUNICATION SYSTEM AND DEVICE THEREFOR

(71) Applicant: LG Electronics Inc., Seoul (KR)

(72) Inventors: Kunil Yum, Seoul (KR); Jiwon Kang, Seoul (KR); Kijun Kim, Seoul (KR); Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/065,761

(22) PCT Filed: Aug. 10, 2017

(86) PCT No.: PCT/KR2017/008667
§ 371 (c)(1),
(2) Date: Jun. 22, 2018

(87) PCT Pub. No.: WO2018/030804
PCT Pub. Date: Feb. 15, 2018

(65) Prior Publication Data

US 2019/0342782 A1 Nov. 7, 2019

Related U.S. Application Data

(60) Provisional application No. 62/481,133, filed on Apr. 4, 2017, provisional application No. 62/469,489, filed
(Continued)

(51) Int. Cl.
*H04W 24/10* (2009.01)
*H04W 72/04* (2009.01)
*H04L 5/00* (2006.01)

(52) U.S. Cl.
CPC ........... *H04W 24/10* (2013.01); *H04L 5/0048* (2013.01); *H04W 72/0413* (2013.01); *H04W 72/0453* (2013.01)

(58) Field of Classification Search
CPC ... H04L 5/0048; H04L 5/0023; H04L 5/0057; H04L 1/0026; H04B 7/0626; H04B 7/0695; H04B 17/24
See application file for complete search history.

(56) References Cited

U.S. PATENT DOCUMENTS

2012/0320816 A1 12/2012 Kim et al.
2012/0327874 A1* 12/2012 Eriksson .............. H04L 5/0057
370/329

(Continued)

FOREIGN PATENT DOCUMENTS

JP 2015502686 1/2015
JP 2015092716 5/2015

(Continued)

OTHER PUBLICATIONS

Schaich et al., Fantastic-5G, Deliverable D3 .1, "Preliminary Results for Multi-service Support in Link Solution Adaptation," Jun. 15, 2016, See pp. 33-60, 148-178; and figures 6-76, 6-77.

(Continued)

*Primary Examiner* — Jung H Park
(74) *Attorney, Agent, or Firm* — Fish & Richardson P.C.

(57) ABSTRACT

A channel state reporting method based on a channel state information-reference signal (CSI-RS) in a wireless communication system, according to one embodiment of the present invention, may comprise the steps of: receiving a CSI-RS configuration associated with a partial band occupying a frequency band configured with a single numerology; and when CSI-RS configurations for multiple partial bands are included in the CSI-RS configuration, configuring the respective multiple partial bands with numerologies that are different from each other, and according to the CSI-RS
(Continued)

configuration associated with the partial band, transmitting CSI information derived from a CSI-RS transmitted from the partial band.

18 Claims, 14 Drawing Sheets

Related U.S. Application Data on Mar. 9, 2017, provisional application No. 62/416,673, filed on Nov. 2, 2016, provisional application No. 62/373,978, filed on Aug. 11, 2016.

(56) References Cited

U.S. PATENT DOCUMENTS

| | | | | |
|---|---|---|---|---|
| 2013/0286964 | A1* | 10/2013 | Chu | H04L 27/261 370/329 |
| 2014/0086084 | A1* | 3/2014 | Bi | H04L 1/0026 370/252 |
| 2014/0286184 | A1 | 9/2014 | Kim et al. | |
| 2015/0098347 | A1* | 4/2015 | Guo | H04L 5/0053 370/252 |
| 2017/0245165 | A1* | 8/2017 | Onggosanusi | H04L 5/0048 |
| 2018/0109968 | A1* | 4/2018 | Luo | H04W 24/08 |

FOREIGN PATENT DOCUMENTS

| | | |
|---|---|---|
| JP | 2015524218 | 8/2015 |
| JP | 2015534396 | 11/2015 |
| JP | 2016500208 | 1/2016 |
| KR | 20140032854 | 3/2014 |
| KR | 20140121391 | 10/2014 |
| WO | WO2016115654 | 7/2016 |
| WO | WO2015099173 | 3/2017 |

OTHER PUBLICATIONS

Panasonic, “Discussion on the Multiplexing of Different Numerologies”, R1-164985, 3GPP TSG-RAN WGI Meeting 85, May 13, 2016, See pp. 1-2; and figure 1.

International Search Report and Written Opinion in International Application No. PCT/KR2017/008667, dated Nov. 17, 2017, 10 page.

Samsung, R1-156784, Discussion on aperiodic CSI-RS resource configuration, 3GPP TSG RAN WG1 #83, 3GPP (Nov. 6, 2015), 3 pages.

Intel Corporation, R1-135099, Discussion on CSI Enhancements for eIMTA Support, 3GPP TSG RAN WG1 #75, 3GPP (Nov. 2, 2013), 5 pages.

Huawei et al., R1-152473, Transmission schemes and CSI support for LAA, 3GPP TSG RAN WG1 #81, 3GPP (May 16, 2015), 4 pages.

Samsung, R1-164011, CSI reporting for NR, 3GPP TSG RAN WG1 #85, 3GPP (May 13, 2016), 6 pages.

Japanese Office Action in Japanese Application No. 2019-507788, dated Jan. 28, 2020, 7 pages (with English translation).

* cited by examiner

Radio frame
Slot
0
1
2
...
18
19
Subframe
( a )
One radio frame, $T_s$=307200T = 10ms
One half-frame, $T_s$=153600T = 5ms
One slot, $T_{slot}$=15360$T_s$
30720$T_s$
Subframe#0
Subframe#2
Subframe#3
Subframe#4
Subframe#5
Subframe#7
Subframe#8
Subframe#9
One subframe, 30720$T_s$
DwPTS
GP
UpPTS
DwPTS
GP
UpPTS
( b )

CHANNEL STATE REPORTING METHOD IN WIRELESS COMMUNICATION SYSTEM AND DEVICE THEREFOR

CROSS-REFERENCE TO RELATED APPLICATIONS

This application is a National Stage application under 35 U.S.C. § 371 of International Application No. PCT/KR2017/008667, filed on Aug. 10, 2017, which claims the benefit of U.S. Provisional Application No. 62/481,133, filed on Apr. 4, 2017, U.S. Provisional Application No. 62/469,489, filed on Mar. 9, 2017, U.S. Provisional Application No. 62/416,673, filed on Nov. 2, 2016, and U.S. Provisional Application No. 62/373,978, filed on Aug. 11, 2016. The disclosures of the prior applications are incorporated by reference in their entirety.

TECHNICAL FIELD

The present disclosure relates to a wireless communication system, and more particularly, to a method and apparatus for reporting a channel state.

BACKGROUND ART

As more and more communication devices require larger communication capacities, there is a need for more enhanced mobile broadband communication (eMBB) than legacy radio access technologies (RATs). In addition, massive machine type communications (mMTC) which connects multiple devices and objects to one another to provide various services at any time in any place is one of main issues to be considered for future-generation communications. Besides, a communication system design which considers services sensitive to reliability and latency is under discussion. As such, the introduction of a future-generation RAT in consideration of eMBB, mMTC, ultra-reliable and low-latency communication (URLLC), and so on is under discussion. In the present disclosure, this technology is referred to as New RAT, for the convenience's sake.

DISCLOSURE

Technical Problem

The present disclosure is intended to propose a method for reporting a channel state. More particularly, the present disclosure is intended to propose a method for reporting a channel state based on a CSI-RS.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

According to an embodiment of the present disclosure, a method for reporting a channel state based on a channel state information-reference signal (CSI-RS) in a wireless communication system may include receiving a CSI-RS configuration related to a partial band occupying a frequency band configured with a single numerology, wherein when the CSI-RS configuration includes CSI-RS configurations for a plurality of partial bands, each of the plurality of partial bands is configured with a different numerology, and transmitting CSI derived from a CSI-RS transmitted in the partial band, according to the CSI-RS configuration related to the partial band.

Additionally or alternatively, the CSI-RS configuration related to the partial band may include information about a bandwidth or a frequency position.

Additionally or alternatively, each of the plurality of partial bands may be a frequency band in which one transport block is transmitted.

Additionally or alternatively, when the CSI-RS configuration includes the CSI-RS configurations for the plurality of partial bands, at least a part of the plurality of partial bands may overlap with each other.

Additionally or alternatively, the at least part of the plurality of partial bands may be time-division multiplexed.

Additionally or alternatively, the transmitted CSI may include CSI derived independently from each of the plurality of partial bands.

Additionally or alternatively, the CSI-RS configuration related to the partial band may be received by higher-layer signaling.

According to another embodiment of the present disclosure, a terminal for reporting a channel state based on a channel state information-reference signal (CSI-RS) in a wireless communication system may include a transmitter and a receiver, and a processor that controls the transmitter and the receiver. The processor may receive a CSI-RS configuration related to a partial band occupying a frequency band configured with a single numerology, wherein when the CSI-RS configuration includes CSI-RS configurations for a plurality of partial bands, each of the plurality of partial bands is configured with a different numerology, and transmit CSI derived from a CSI-RS transmitted in the partial band, according to the CSI-RS configuration related to the partial band.

Additionally or alternatively, the CSI-RS configuration related to the partial band may include information about a bandwidth or a frequency position.

Additionally or alternatively, each of the plurality of partial bands may be a frequency band in which one transport block is transmitted.

Additionally or alternatively, when the CSI-RS configuration includes the CSI-RS configurations for the plurality of partial bands, at least a part of the plurality of partial bands may overlap with each other.

Additionally or alternatively, the at least part of the plurality of partial bands may be time-division multiplexed.

Additionally or alternatively, the transmitted CSI may include CSI derived independently from each of the plurality of partial bands.

Additionally or alternatively, the CSI-RS configuration related to the partial band may be received by higher-layer signaling.

The foregoing solutions are merely a part of the embodiments of the present disclosure, and those skilled in the art could derive and understand various embodiments reflecting the technical features of the present disclosure from the following detailed description of the present disclosure.

Advantageous Effects

According to the embodiments of the present disclosure, a channel state report may be efficiently processed.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

BEST MODE FOR CARRYING OUT THE INVENTION

Figure 1:
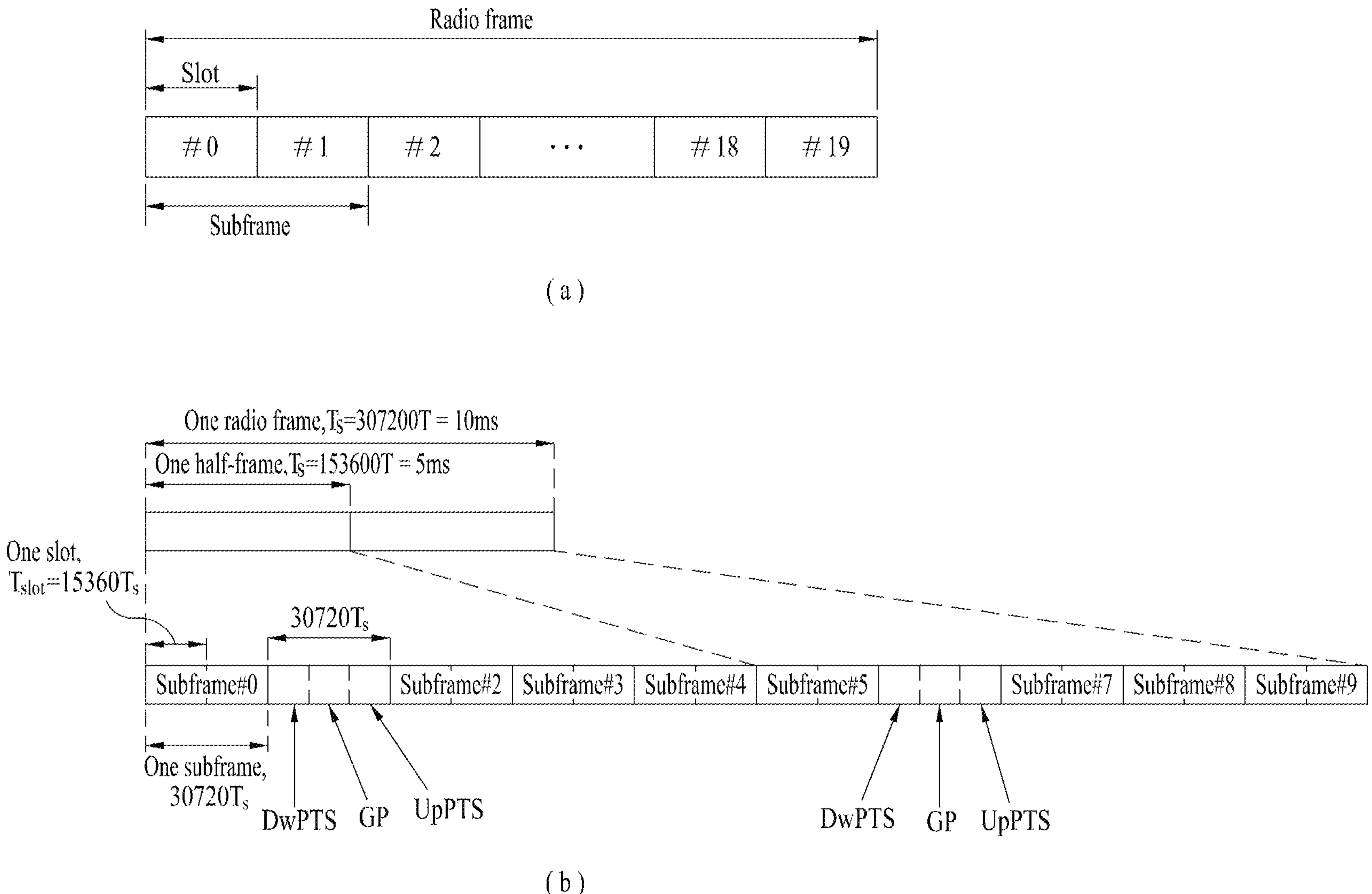
FIG. 1 illustrates an exemplary radio frame structure in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlike a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g., macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming). DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(*a*) illustrates a frame structure for frequency division duplex (FDD) used in 3GPP LTE/LTE-A and FIG. 1(*b*) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL | Downlink-to-Uplink Switch-point | Subframe number | | | | | | | | | |
|---|---|---|---|---|---|---|---|---|---|---|---|
| configuration | periodicity | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

Figure 2:
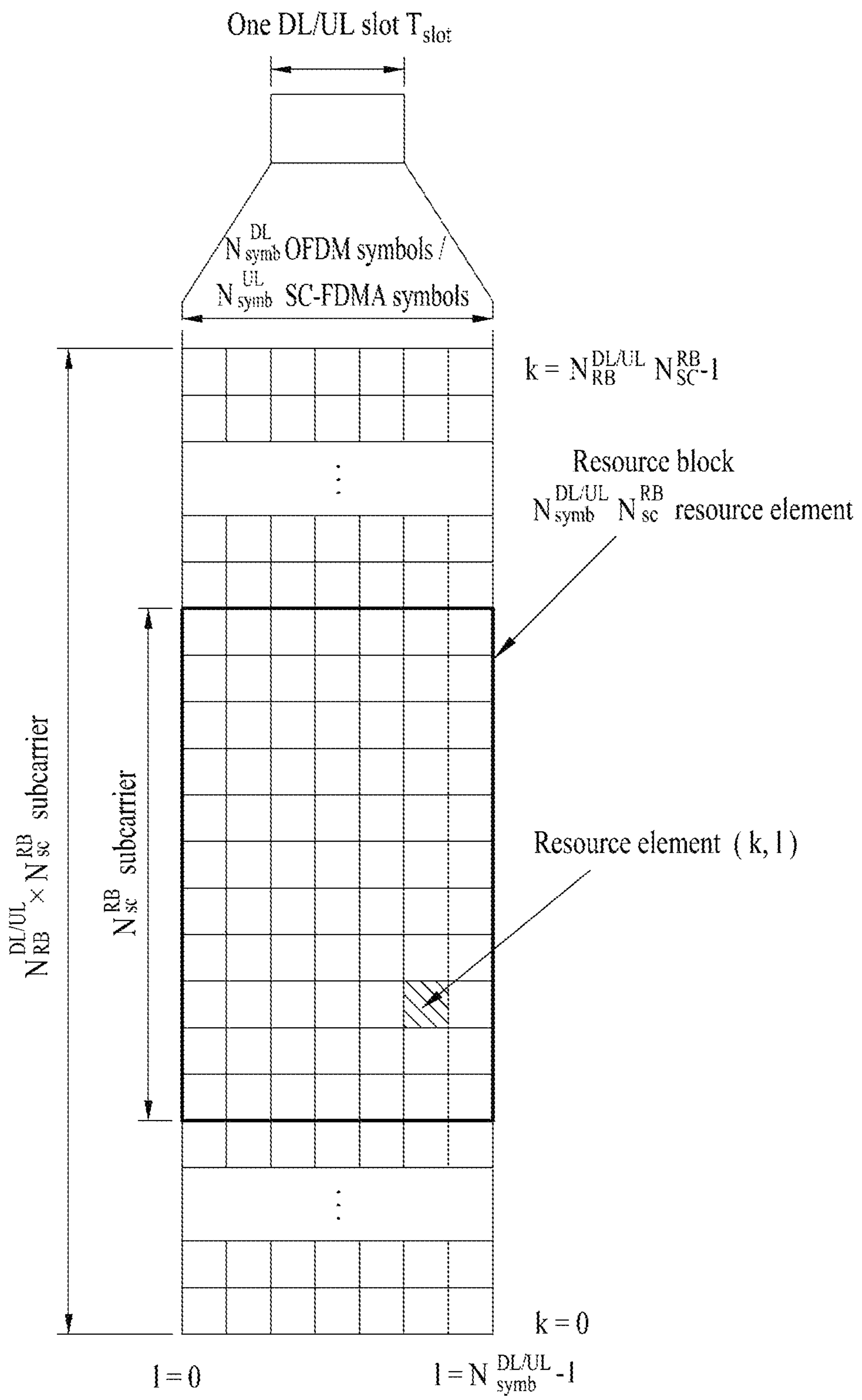
FIG. 2 illustrates an exemplary downlink/uplink (DL/UL) slot structure in the wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL}*N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL}*N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g., 7) consecutive OFDM symbols in the time domain and $N_{sc}^{RB}$ (e.g., 12) consecutive subcarriers in the frequency domain. For reference, a resource composed by an OFDM symbol and a subcarrier is called a resource element (RE) or a tone. Accordingly, an RB is composed of $N_{symb}^{DL/UL}*N_{sc}^{RB}$ REs. Each RE in a resource grid can be uniquely defined by an index pair (k, l) in a slot. Here, k is an index in the range of 0 to $N_{symb}^{DL/UL}*N_{sc}^{RB}-1$ in the frequency domain and l is an index in the range of 0 to $N_{symb}^{DL/UL}-1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, nPRB=nVRB is obtained. Numbers are given to the localized VRBs from 0 to $N_{VRB}^{DL}-1$, and $N_{VRB}^{DL}=N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
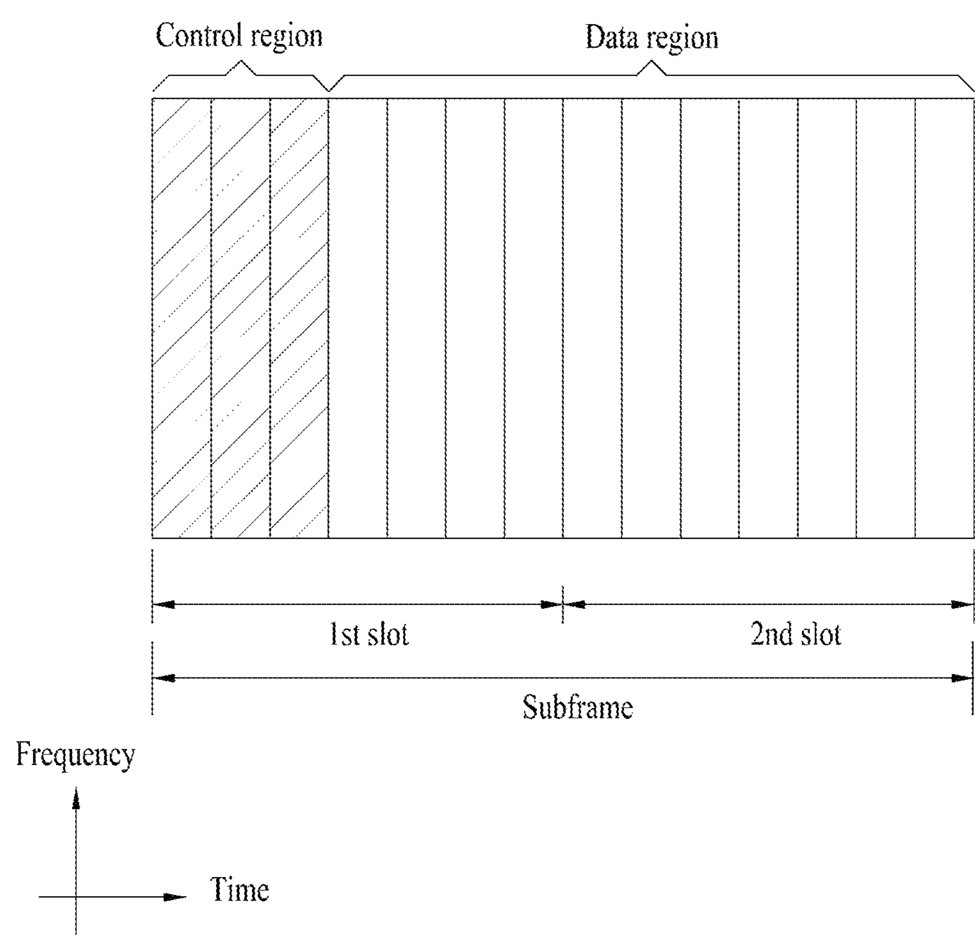
FIG. 3 illustrates an exemplary DL subframe structure in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Search Space | | | Number of PDCCH |
|---|---|---|---|
| Type | Aggregation Level L | Size [in CCEs] | candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
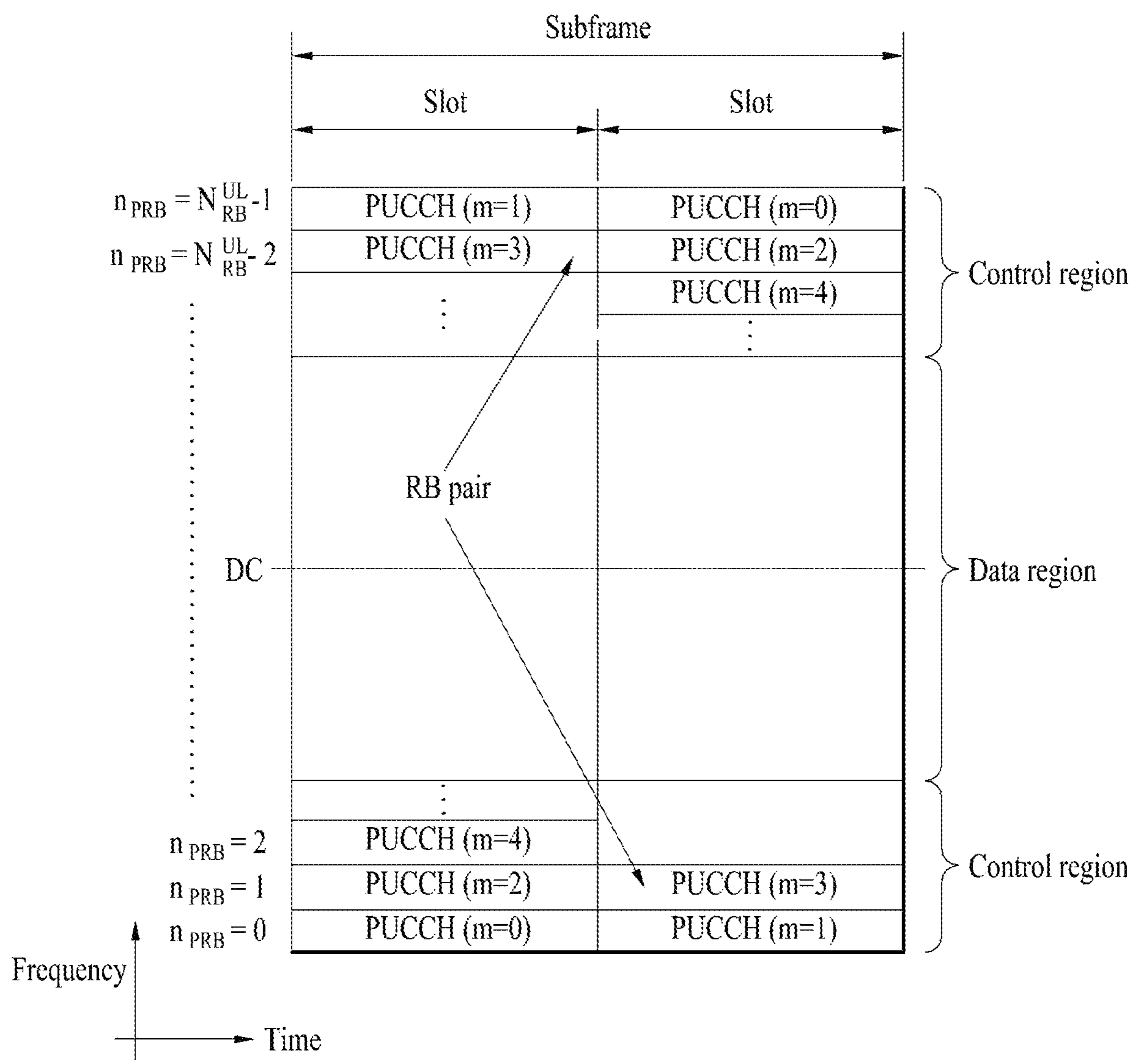
FIG. 4 illustrates an exemplary UL subframe structure in the 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

CSI Reporting

In the 3GPP LTE(-A) system, a user equipment (UE) is defined to report CSI to a BS. Herein, the CSI collectively refers to information indicating the quality of a radio channel (also called a link) created between a UE and an antenna port. The CSI includes, for example, a rank indicator (RI), a precoding matrix indicator (PMI), and a channel quality indicator (CQI). Herein, the RI, which indicates rank information about a channel, refers to the number of streams that a UE receives through the same time-frequency resource. The RI value is determined depending on long-term fading of the channel, and is thus usually fed back to the BS by the UE with a longer period than for the PMI and CQI. The PMI, which has a value reflecting the channel space property, indicates a precoding index preferred by the UE based on a metric such as SINR. The CQI, which has a value indicating the intensity of a channel, typically refers to a receive SINR which may be obtained by the BS when the PMI is used.

The UE calculates, based on measurement of the radio channel, a preferred PMI and RI from which an optimum or highest transmission rate may be derived when used by the BS in the current channel state, and feeds back the calculated PMI and RI to the BS. Herein, the CQI refers to a modulation and coding scheme providing an acceptable packet error probability for the PMI/RI that is fed back.

In the LTE-A system which is expected to include more precise MU-MIMO and explicit CoMP operations, current CSI feedback is defined in LTE, and thus new operations to be introduced may not be sufficiently supported. As requirements for CSI feedback accuracy for obtaining sufficient MU-MIMO or CoMP throughput gain became complicated, it has been agreed that the PMI should be configured with a long term/wideband PMI ($W_1$) and a short term/subband PMI ($W_2$). In other words, the final PMI is expressed as a function of $W_1$ and $W_2$. For example, the final PMI W may be defined as follows: $W=W_1*W_2$ or $W=W_2*W_1$. Accordingly, in LTE-A, the CSI may include RI, $W_1$, $W_2$ and CQI.

In the 3GPP LTE(-A) system, an uplink channel used for CSI transmission is configured as shown in Table 5.

TABLE 5

| Scheduling scheme | Periodic CSI transmission | Aperiodic CSI transmission |
|---|---|---|
| Frequency non-selective | PUCCH | — |
| Frequency selective | PUCCH | PUSCH |

Referring to Table 5, CSI may be transmitted with a periodicity defined in a higher layer, using a physical uplink control channel (PUCCH). When needed by the scheduler, a physical uplink shared channel (PUSCH) may be aperiodically used to transmit the CSI. Transmission of the CSI over the PUSCH is possible only in the case of frequency selective scheduling and aperiodic CSI transmission. Hereinafter, CSI transmission schemes according to scheduling schemes and periodicity will be described.

1) Transmitting the CQI/PMI/RI Over the PUSCH after Receiving a CSI Transmission Request Control Signal (a CSI Request)

A PUSCH scheduling control signal (UL grant) transmitted over a PDCCH may include a control signal for requesting transmission of CSI. The table below shows modes of the UE in which the CQI, PMI and RI are transmitted over the PUSCH.

TABLE 6

| | | PMI Feedback Type | | |
|---|---|---|---|---|
| | | No PMI | Single PMI | Multiple PMIs |
| PUSCH CQI Feedback Type | Wideband (Wideband CQI)<br>UE selected (Subband CQI)<br>Higher Layer-configured (Subband CQI) | Mode 2-0<br>RI (only for Open-loop SM)<br>1st wideband CQI(4 bit) + Best-M CQI(2 bit)<br>(Best-M CQI: An average CQI for M SBs selected from among N SBs)<br>Best-M index (L bit)<br>Mode 3-0<br>RI (only for Open-loop SM)<br>1st wideband CQI(4 bit) + N*subbandCQI(2 bit) | Mode 3-1<br>RI<br>1st wideband CQI(4 bit) + N*subbandCQI(2 bit)<br>2nd wideband CQI(4 bit) + N*subbandCQI(2 bit) if RI > 1<br>Wideband PMI(4 bit)<br>(if 8Tx Ant, wideband W2 + wideband W1) | Mode 1-2<br>RI<br>1st wideband CQI(4 bit)<br>2nd wideband CQI(4 bit) if RI > 1<br>N*Subband PMI(4 bit)<br>(N is the total # of subbands)<br>(if 8Tx Ant, N*subband W2 + wideband W1)<br>Mode 2-2<br>RI<br>1st wideband CQI(4 bit) + Best-M CQI(2 bit)<br>2nd wideband CQI(4 bit) + Best-M CQI(2 bit) if RI > 1<br>Best-M index (L bit)<br>Wideband PMI(4 bit) + Best-M |

TABLE 6-continued

| | PMI Feedback Type | | |
|---|---|---|---|
| | No PMI | Single PMI | Multiple PMIs |
| | | | PMI(4 bit)<br>(if 8Tx Ant,<br>wideband W2 +<br>Best-M W2 +<br>wideband W1)<br>Mode 3-2<br>RI<br>1st wideband<br>CQI(4 bit) +<br>N*subbandCQI(2 bit)<br>2nd wideband<br>CQI(4 bit) +<br>N*subbandCQI(2 bit)<br>if RI > 1<br>N*Subband<br>PMI(4 bit)<br>(N is the total # of<br>subbands)<br>(if 8Tx Ant,<br>N*subband W2 +<br>wideband W1) |

The transmission modes in Table 6 are selected in a higher layer, and the CQI/PMI/RI are all transmitted in a PUSCH subframe. Hereinafter, uplink transmission methods for the UE according to the respective modes will be described.

Mode 1-2 represents a case where precoding matrices are selected on the assumption that data is transmitted only in subbands. The UE generates a CQI on the assumption of a precoding matrix selected for a system band or a whole band (set S) designated in a higher layer. In Mode 1-2, the UE may transmit a CQI and a PMI value for each subband. Herein, the size of each subband may depend on the size of the system band.

A UE in Mode 2-0 may select M preferred subbands for a system band or a band (set S) designated in a higher layer. The UE may generate one CQI value on the assumption that data is transmitted for the M selected subbands. Preferably, the UE additionally reports one CQI (wideband CQI) value for the system band or set S. If there are multiple codewords for the M selected subbands, the UE defines a CQI value for each codeword in a differential form.

In this case, the differential CQI value is determined as a difference between an index corresponding to the CQI value for the M selected subbands and a wideband (WB) CQI index.

The UE in Mode 2-0 may transmit, to a BS, information about the positions of the M selected subbands, one CQI value for the M selected subbands and a CQI value generated for the whole band or designated band (set S). Herein, the size of a subband and the value of M may depend on the size of the system band.

A UE in Mode 2-2 may select positions of M preferred subbands and a single precoding matrix for the M preferred subbands simultaneously on the assumption that data is transmitted through the M preferred subbands. Herein, a CQI value for the M preferred subbands is defined for each codeword. In addition, the UE additionally generates a wideband CQI value for the system band or a designated band (set S).

The UE in Mode 2-2 may transmit, to the BS, information about the positions of the M preferred subbands, one CQI value for the M selected subbands and a single PMI for the M preferred subbands, a wideband PMI, and a wideband CQI value. Herein, the size of a subband and the value of M may depend on the size of the system band.

A UE in Mode 3-0 generates a wideband CQI value. The UE generates a CQI value for each subband on the assumption that data is transmitted through each subband. In this case, even if RI>1, the CQI value represents only the CQI value for the first codeword.

A UE in Mode 3-1 generates a single precoding matrix for the system band or a designated band (set S). The UE generates a CQI subband for each codeword on the assumption of the single precoding matrix generated for each subband. In addition, the UE may generate a wideband CQI on the assumption of the single precoding matrix. The CQI value for each subband may be expressed in a differential form. The subband CQI value is calculated as a difference between the subband CQI index and the wideband CQI index. Herein, the size of each subband may depend on the size of the system band.

A UE in Mode 3-2 generates a precoding matrix for each subband in place of a single precoding matrix for the whole band, in contrast with the UE in Mode 3-1.

2) Periodic CQI/PMI/RI Transmission Over PUCCH

The UE may periodically transmit CSI (e.g., CQI/PMI/PTI (precoding type indicator) and/or RI information) to the BS over a PUCCH. If the UE receives a control signal instructing transmission of user data, the UE may transmit a CQI over the PUCCH. Even if the control signal is transmitted over a PUSCH, the CQI/PMI/PTI/RI may be transmitted in one of the modes defined in the following table.

TABLE 7

| | | PMI feedback type | |
|---|---|---|---|
| | | No PMI | Single PMI |
| PUCCH CQI feedback type | Wideband (wideband CQI) | Mode 1-0 | Mode 1-1 |
| | UE selective (subband CQI) | Mode 2-0 | Mode 2-1 |

A UE may be set in transmission modes as shown in Table 7. Referring to Table 7, in Mode 2-0 and Mode 2-1, a bandwidth part (BP) may be a set of subbands consecutively positioned in the frequency domain, and cover the system band or a designated band (set S). In Table 9, the size of each subband, the size of a BP and the number of BPs may depend on the size of the system band. In addition, the UE transmits CQIs for respective BPs in ascending order in the frequency domain so as to cover the system band or designated band (set S).

The UE may have the following PUCCH transmission types according to a transmission combination of CQI/PMI/PTI/RI.

i) Type 1: the UE transmits a subband (SB) CQI of Mode 2-0 and Mode 2-1.

ii) Type 1a: the UE transmits an SB CQI and a second PMI.

iii) Types 2, 2b and 2c: the UE transmits a WB-CQI/PMI.

iv) Type 2a: the UE transmits a WB PMI.

v) Type 3: the UE transmits an RI.

vi) Type 4: the UE transmits a WB CQI.

vii) Type 5: the UE transmits an RI and a WB PMI.

viii) Type 6: the UE transmits an RI and a PTI.

ix) Type 7: the UE transmits a CRI (CSI-RS resource indicator) and an RI.

x) Type 8: the UE transmits a CRI, an RI and a WB PMI.

xi) Type 9: the UE transmits a CRI, an RI and a PTI (precoding type indication).

xii) Type 10: the UE transmits a CRI.

When the UE transmits an RI and a WB CQI/PMI, the CQI/PMI are transmitted in subframes having different periodicities and offsets. If the RI needs to be transmitted in the same subframe as the WB CQI/PMI, the CQI/PMI are not transmitted.

Aperiodic CSI Request

If a carrier aggregation (CA) environment is considered, a 2-bit CSI request field is used in DCI format 0 or 4, for an aperiodic CSI feedback in the current LTE standards. If a plurality of serving cells are configured for a UE in the CA environment, the UE interprets the CSI request field in 2 bits. If one of TM 1 to TM 9 is configured for every component carrier (CC), an aperiodic CSI feedback is triggered according to values listed in Table 8 below. If TM 10 is configured for at least one of all CCs, an aperiodic CSI feedback is triggered according to values listed in Table 9 below.

TABLE 8

| Values of CSI request field | Description |
|---|---|
| '00' | Aperiodic CSI reporting is not triggered |
| '01' | Aperiodic CSI reporting is triggered for serving cell |
| '10' | Aperiodic CSI reporting is triggered for a first set of serving cells configured by higher layer |
| '11' | Aperiodic CSI reporting is triggered for a second set of serving cells configured by higher layer |

TABLE 9

| Values of CSI request field | Description |
|---|---|
| '00' | Aperiodic CSI reporting is not triggered |
| '01' | Aperiodic CSI reporting is triggered for CSI process set configured for serving cell by higher layer |
| '10' | Aperiodic CSI reporting is triggered for a first set of CSI processes configured by higher layer |
| '11' | Aperiodic CSI reporting is triggered for a second set of CSI processes configured by higher layer |

In the case where multi-stage CSI is used to reduce overhead in an environment in which communication is conducted through a large number of antenna ports, as is the case with New RAT (NR), the present disclosure defines each stage by an RS type and a feedback type, and proposes a signaling method for configuring a stage for a UE and dynamically signaling the configured stage to the UE.

Multi-stage CSI is considered to reduce the overhead of feedback in NR-MIMO using a large number of antenna ports. Each stage of multi-stage CSI is defined by a pair of an RS for CSI and a feedback type. For this purpose, the following configurations may be given.

One CSI process may include one or more stage configurations.

One stage configuration may correspond to a pair of one CSI reporting configuration and one RS configuration.

One stage configuration may include a plurality of feedback types.

A feedback type may include information about what feedback information is to be transmitted, a feedback timing (or a range of feedback timing values which may be indicated by DCI), a CSI calculation method (e.g., explicit or implicit), a frequency granularity (e.g., wideband, partial band, or subband), and so on.

An RS configuration may include a plurality of RS pattern candidates which a UE may indicate by DCI or the like, and include information about a period p and the number k of subframes in which a corresponding RS pattern is transmitted. In this case, a total time length taken to transmit a corresponding RS may be p*k subframes.

The above-described CSI process, stage configuration, and information included in the stage configuration may be configured for a UE by higher-layer signaling such as RRC signaling or the like.

One feedback type may be applied to a plurality of stage configurations. For example, although different RSs (e.g., BRS and a plurality of CSI-RSs with different precoding) are defined for an analog beam selection stage and a digital beam selection stage, a feedback in each stage may include only a feedback of a beam index. In this case, mapping between a port/beam index and a feedback index may be defined for each RS. For example, beam index 0 to be fed back may correspond to a lowest port/beam index. In this case, for the BRS, ports 0 to 7 may correspond to beam indexes 0 to 7 to be fed back, whereas for a beam refinement reference signal (BRRS), ports 600 to 607 may correspond to beam indexes 0 to 7 to be fed back, respectively.

The following purposes may be considered in each CSI stage.

1. Analog beam selection: an analog beam used in an eNB is selected.

2. Digital beam selection: if the eNB has more antenna ports than TXUs of the eNB, as many ports as used for actual data transmission (e.g., the number of TXUs) are indicated to a UE.

3. CSI acquisition: the UE calculates/reports CSI, for use in actual data transmission.

4. Partial band selection: a partial band for the UE to use for data transmission is determined and limited. In this case, the UE may be scheduled only in the partial band.

5. CSI tracking: CSI for the partial band is calculated/reported under the partial band limitation.

The partial band limitation in the partial band selection and the CSI tracking may be used by the eNB, for per-service dedicated partial band reporting. In other words, in the partial band selection, the eNB may configure a specific UE to calculate/report CSI of a partial band corresponding to each service (e.g., partial bands for eMBB, URLLC, mMTC, and so on) to be used for the specific UE. In the CSI tracking, the eNB may transmit an RS only in a partial band dedicated to a service which is selected based on the acquired CSI or which is configured for the UE by an MIB/SIB, higher layer signaling, or the like, and configure the UE to calculate and report only CSI for the corresponding partial band.

Further, the partial band limitation in the partial band selection and the CSI tracking may mean a scheme in which the eNB is capable of continuously using a subband scheduled for the UE until before data transmission is completed or an update is separately performed, from the perspective of resource allocation based on subband CSI. This scheme may also be used for per-service dedicated partial band reporting. For this purpose, a subband should be defined on a partial band basis. That is, a subband may be defined as a partial band, or a plurality of subbands may be defined in one partial band. That is, one subband is not defined to be across two partial bands.

Besides the above example, an additional purpose of determining a data transmission scheme (e.g., a CQI, precoding, and a transmission layer) which the eNB will use for the UE may also be considered.

3.1. CSI Stage

Multi-stage CSI includes a plurality of CSI stages, and the following RS-feedback type pairs may be considered for each CSI stage.

① Multiple wideband RS with different precoding, and CSI-RS resource indicator (CRI) (beam index reporting)

② Multiple wideband RS with different precoding, and wideband CSI with CRI

③ Multiple wideband RS with different precoding, and subband CSI with CRI

④ Wideband RS and wideband CSI

⑤ Wideband RS and subband CSI

⑥ Partial band RS and wideband CSI

⑦ Partial band RS and subband CSI

⑧ Wideband RS and partial band CSI

⑨ Multiple analog beam, and beam selection index (BSI)

While CSI stages are defined in consideration of the number of RSs and the frequency granularity of an RS in the aspect of RS, and the frequency granularity of a feedback in the aspect of feedback type in the above example, other characteristics may additionally be considered as follows.

RS aspect

RS type-BRS, BRRS, RRM-RS, DMRS, etc.

Cell-specific/UE-specific RS frequency feedback aspect

Periodic/aperiodic CSI feedback

Explicit/implicit feedback

Long/short reporting timing

Precoding information/channel quality information/information about the number of layers, etc.

In each CSI stage, the UE may calculate CSI of an indicated feedback type by using an indicated RS, and report the CSI in indicated feedback resources (time-frequency resources) to the eNB.

The partial band RS is a scheme in which an RS is transmitted across a whole indicated partial band. A partial band may be identical to a per-service dedicated partial band, or a subband in which the eNB simply intends to transmit data until an update is performed or data transmission is completed, after the subband is scheduled.

In other words, a partial band and a subband may be defined as follows.

Partial band: a band for a specific service that a UE is operating within a wideband.

Subband: a band in which a UE can be scheduled within a partial band.

Or since a partial band may correspond to frequency resources for which a system numerology such as a TTI, a subframe slot length, a subcarrier spacing, and so on may be different in order to support a different service at the level of the physical layer, the partial band may be defined as follows.

Partial band: a UE-supported largest bandwidth having the same numerology (e.g., a slot/subframe length, a TTI, and a subcarrier spacing) within a wideband.

Particularly, because information about a service in the foregoing definitions of a partial band may not be explicitly configured for the UE, the partial band is actually defined for the UE as 1) a band configured within a band having the same numerology, and 2) a band in which the UE monitors a control channel and/or data is actually scheduled. In other words, partial bands (i.e., partial band CSI-RSs/IMRs) should be defined separately for bands having different numerologies, and CSI calculation/reporting should also be performed independently for each partial band.

In this case, the frequency change characteristics of a partial band CSI-RS are semi-static, and thus the partial band CSI-RS may be preconfigured by higher-layer signaling (e.g., RRC signaling). A subband CSI-RS should be configured dynamically according to the traffic state of the eNB. Therefore, the subband CSI-RS may be configured dynamically by L1 signaling or L2 signaling, like DCI. However, it is possible to preconfigure candidate resources in which the subband CSI-RS can be transmitted by higher-layer signaling such as RRC signaling, and to trigger on or off the subband CSI-RS dynamically by L1/L2 signaling.

For example, partial band configuration information (e.g., PRB starting index and ending index) and subband configuration information (e.g., a subband size: N PRBs) may be configured by RRC signaling. If the subband configuration information is determined in a predetermined rule, the subband configuration information may be excluded from the signaling. For example, the bandwidth of a subband may be determined to be N PRBs according to N determined based on a system bandwidth, the bandwidth of a UE-specific wideband, or the bandwidth of a partial band (herein, N is a natural number). Subsequently, information indicating subband CSI-RSs transmitted in a partial band may be included in the form of a bitmap in aperiodic CSI-RS triggering DCI. Similarly, the bitmap information may also be included in CSI-RS on/off DCI for semi-persistent CSI-RS transmission.

In addition, the concept of a bandwidth part has been introduced newly, and a partial band and a bandwidth part may be the same for a partial band CSI-RS. Further, one or more bandwidth part configurations may be configured for the UE on a component carrier (CC) basis, and each bandwidth part is a group of contiguous PRBs. Also, the bandwidth of the bandwidth part is equal to or less than a maximum bandwidth (performance) supported by the UE, and equal to or larger than at least the bandwidth of a synchronization signal (SS) used in beam management. A configuration for this bandwidth part may include a numerology, a frequency position (e.g., a center frequency), or a bandwidth.

Each bandwidth part is associated with a specific numerology (a subcarrier spacing, a CP type, etc.), and the UE expects that at least one DL bandwidth part and one UL bandwidth part from a set of configured bandwidth parts will be activated at a given time. It is assumed that the UE transmits and receives a signal only in the activated DL/UL bandwidth part(s) by using the associated numerology.

Particularly, wideband RS, partial band RS, and subband RS may be defined separately. That is, the three layers of wideband RS, partial band RS, and subband RS may be defined. The subband RS has the same granularity as the subband CSI. That is, a plurality of subband RSs may be defined in a partial band or wideband for which an RS is defined.

If the UE fails to monitor the entire system bandwidth, in other words, if the UE has a capability of using only part of the system band, the wideband may mean a maximum bandwidth configured for the UE. If the UE is for a specific service only, the wideband RS and the partial band RS of the UE may have the same frequency granularity. That is, the wideband for the wideband RS may be defined as follows.

Wideband: the largest bandwidth supported by the UE.

If CA is considered, it is natural to define CSI individually for each CC. Accordingly, the following definition may be more accurate.

Wideband: the largest bandwidth supported by the UE per CC

Or the eNB may configure a band equal to or smaller than a maximum frequency band available to the UE as a candidate bandwidth in which data can be received. This band may be defined as one wideband, and configured as one CSI-related operation unit. The wideband may be configured for the UE by a system information block (SIB) or the like, or by higher-layer signaling such as RRC signaling or the like, for more flexibility. A plurality of such widebands may be configured within the maximum bandwidth supported by the UE. Herein, the widebands may overlap with each other. Therefore, transmission of an RS in each wideband configured for the UE, and CSI measurement/reporting for the wideband may be performed independently from transmission of an RS in another wideband, and CSI measurement/reporting for the another wideband. In this case, a plurality of partial bands having different numerologies may be defined individually in each wideband (both TDM and FDM are possible). A UE-side partial band defined in a wideband in this manner may correspond to only part of a partial band configured on the eNB side (e.g., a band having the same numerology). If a single numerology is defined for the corresponding wideband, wideband CSI and partial band CSI may be identical. Then, the partial band CSI (reporting) may be omitted.

Characteristically, if the UE operates only in a specific partial band, like using only a specific operation (e.g., mMTC, or a data subband operation), the eNB may set the frequency granularity of the wideband RS to be equal to that of the partial band RS. In other words, the frequency area of the wideband and the frequency area of the partial band may be of the same size.

Particularly, a wideband may be a frequency band unit in which control information and/or data is transmitted to a UE, more characteristically, a unit in which one transport block (TB) can be transmitted. In this case, it is assumed that partial bands having different numerologies in one wideband are not multiplexed in FDM or are not multiplexed in FDM at least at a specific time. That is, a plurality of partial bands may be defined only in TDM in one wideband. For example, although two partial bands having different subcarrier spacings or frequency bands of the same size may be defined in one wideband, the two partial bands are used at different timings.

For the above operation, a CSI process may be configured for each wideband. That is, an independent CSI-RS and an independent CSI reporting configuration are given, and CSI-RS transmission and measurement/reporting operations are performed, on a 'wideband' basis. In this case, CSI for a plurality of widebands may be reported in one UL resource.

For the purpose of beam management or radio resource management (RRM) measurement, the eNB may transmit a CSI-RS for an entire band that the UE can see. For this purpose, the eNB may transmit a plurality of wideband CSI-RSs covering an entire band of interest, for the usage of beam management or RRM measurement. Or a kind of 'super-wideband' may be defined as a maximum frequency band available to the UE or the total system bandwidth of a carrier, so that the eNB may transmit a CSI-RS for the super-wideband. Regarding a UE operation for corresponding CSI, if the UE supports the bandwidth of the super-wideband, reference resources may refer to a bandwidth within one timing (e.g., a slot). If the UE fails to support the total bandwidth at one time, the reference resources of the super-wideband may be an aggregation across a partial bandwidth which occupies a plurality of timings (e.g., slots).

Or the wideband refers to a frequency band in which a control channel is transmitted, which may be a frequency band in which a control channel is scheduled, not a frequency band in which data is scheduled. That is, a wideband RS may be transmitted across a frequency band in which a control channel is scheduled, or CSI for the band may be defined as wideband CSI. If a data transmission band and a control signal transmission band are different, the UE may report CSI for a control channel by wideband CSI, and thus a more stable control channel transmission may be performed.

In calculating each CSI, the UE assumes that a target band has the same numerology (e.g., a subcarrier spacing and a TTI size).

An RS for interference measurement (i.e., a CSI-interference measurement (CSI-IM)) may be defined in a similar structure to that of the afore-mentioned RS for CSI. That is, wideband CSI-IM/partial band CSI-IM/subband CSI-IM may be defined as CSI-IM granularities and included in the following stages. Particularly, as one RS and a plurality of CSI-IMs are included in each stage, CSI for a multi-interference assumption may be reported. Similarly to the case of the RS for CSI, a target band for CSI interference measurement may be indicated semi-statically by higher-layer signaling such as RRC signaling in the case of partial band CSI-IM, and dynamically by L1 signaling such as DCI in the case of subband CSI-IM.

In this case, the CSI-IM may have a different frequency granularity from the RS for CSI. That is, a wideband/partial band/subband configuration for IM and a wideband/partial band/subband configuration for CSI-RS resources may be configured differently. When CSI measurement is configured for the UE, a combination of a CSI-RS and a CSI-IM having different frequency granularities is also available. For example, a subband RS for CSI and a partial band CSI-IM may be transmitted together, or an RS for CSI and a CSI-IM for different subband sizes may be defined and transmitted together.

Additionally, when CSI reporting for each wideband/partial band/subband which has been defined above is considered, a frequency granularity for the CSI reporting may also be configured independently of the CSI-RS and the CSI-IM. Further, different granularities may be used in combination. For example, it is possible to indicate subband CSI reporting based on a wideband CSI-RS and a partial band CSI-IM.

When frequency granularities are configured for the CSI-RS, CSI-IM, and CSI reporting, an RF unit is generally configured to be shared much between transmission and reception ends. Therefore, it may be regulated that a wideband CSI configuration and/or a partial band CSI configuration are always set to be the same.

In the above 'partial band RS and wideband CSI', the wideband CSI means CSI for a corresponding partial band (i.e., a whole area carrying the partial band RS).

In other words, when partial band CSI is reported, a CSI reporting configuration may not include partial band configuration information. Rather a band configuration for a target non-zero power (NZP) CSI-RS may be used. For example, if CSI reporting configuration 1 linked to resource configuration 1 (along with bandwidth part 1), and CSI reporting configuration 2 linked to resource configuration 2 (along with bandwidth part 2) are used for the UE, the UE may calculate/report CSI for each of bandwidth part 1 and bandwidth part 2. In this case, the eNB may dynamically indicate to the UE a CSI reporting configuration for a bandwidth part for which CSI is to be calculated.

For one CSI reporting configuration, resource configurations for a plurality of bandwidth parts may be configured. For example, resource configuration 1 (along with bandwidth part 1) and resource configuration 2 (along with bandwidth part 2) may be included in one CSI reporting configuration. In this case, CSI for a plurality of partial bands in the CSI reporting configuration may be calculated/reported at the same time. Or it may be configured that the eNB dynamically indicates specific resources to the UE so that the UE may calculate/report CSI for a specific bandwidth part.

The subband CSI is a scheme in which a plurality of subbands are defined within a partial band or wideband in which an RS is defined, and then CSI for each subband is calculated and reported. For example, if an eMBB partial band is defined, and a specific UE is configured to use the partial band/service, a plurality of subbands may be defined in the eMBB partial band, and the UE may calculate and report CSI for each of the subbands.

Figure 5:
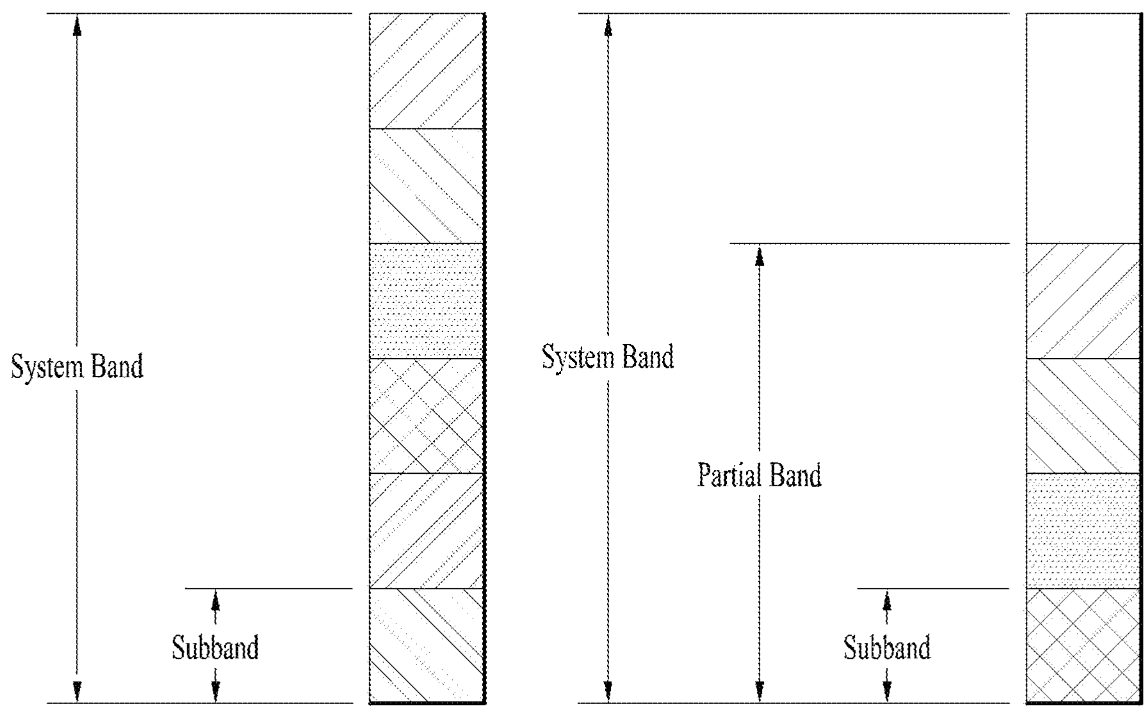
FIG. 5 illustrates a relationship among a system bandwidth, a partial band, and a subband.

FIG. 5 illustrates a relationship among a system bandwidth, a partial band, and a subband.

Multi-stage CSI of 2 CSI stages may be considered as follows.

Stage 1. Digital beam selection: ① multiple wideband RS with different precoding, and CRI Stage 2. CSI acquisition: ④ wideband RS and wideband CSI Or for subband scheduling/CSI, the following 2 CSI stages may be defined.

Stage 1. Digital beam selection: ① multiple wideband RS with different precoding, and CRI Stage 2. CSI acquisition: ⑤ wideband RS and subband CSI Or two or more purposes may be defined for one CSI stage as follows.

Stage 1. Beam acquisition and CSI acquisition: ③ multiple wideband RS with different precoding, and subband CSI with CRI Stage 2. CSI acquisition: ⑤ wideband RS and subband CSI Or one stage may be defined across a plurality of subframes.

Stage 1. Beam acquisition and CSI acquisition: ⑤ wideband RS and subband CSI (transmitted along with RSs beamformed differently at different time points in a plurality of subframes)

Stage 2. CSI acquisition: ⑤ wideband RS and subband CSI

Like the above example, RS characteristics and a feedback operation may also be defined identically for the UE according to a stage.

Or if partial band limitation is used, which means after a subband is scheduled, a UE continuously transmits a signal in the scheduled subband, the following may be defined.

Stage 1. Beam acquisition and CSI acquisition: ① multiple wideband RS with different precoding, and CRI Stage 2. CSI tracking: ⑥ partial band RS and wideband CSI Or if the above scheme (partial band limitation based on subband CSI) is used, 3 CSI stages may be defined.

Stage 1. Beam acquisition and CSI acquisition: ① multiple wideband RS with different precoding, and CRI Stage 2. CSI acquisition: ⑤ wideband RS and subband CSI Stage 3. CSI tracking: ⑥ partial band RS and wideband CSI Or if per-service dedicated partial bands are used, and a service/partial band is to be selected by partial band CSI based on the wideband RS, the following 3 CSI stages may be defined.

Stage 1. Digital beam selection: ① multiple wideband RS with different precoding, and CRI Stage 2. Partial band selection: ⑧ wideband RS and partial band CSI Stage 3. CSI tracking: ⑥ partial band RS and wideband CSI Or analog beam selection may be included in a multi-stage CSI process.

Stage 1. Analog beam selection: ⑨ a plurality of analog beams, and BSI

Stage 2. Digital beam selection: ① multiple wideband RS with different precoding, and CRI Stage 3. CSI tracking: ⑤ wideband RS and subband CSI 3.2 DCI Signaling for CSI Stage For operations (e.g., RS transmission indication and aperiodic CSI request) in each CSI stage, a 'CSI stage trigger' may be defined and transmitted to the UE. For example, in the case where the above 3 CSI stages are defined for a per-service dedicated partial band, DCI may carry a 2-bit CSI stage trigger, and the following states of the CSI stage trigger may be defined.

TABLE 10

| State | Description |
|---|---|
| 00 | No trigger |
| 01 | Stage 1. Digital beam selection-multiple wideband RS with different precoding, CRI |
| 10 | Stage 2. Partial band selection-wideband RS, subband selection |
| 11 | Stage 3. CSI tracking-partial band RS, wideband CSI |

For this purpose, the following content may be included in DCI and transmitted to the UE by the eNB.

1. Multiple RSs Indication

A. Bitmap: an RS set corresponding to each bit of a bitmap is configured, and the eNB may transmit, to the UE, a bitmap in which a bit corresponding to an RS set to be transmitted is set to 1. The UE may read the bitmap, and measure RSs corresponding to the bit set to 1.

B. RS Number Indication:

A plurality of RS patterns are configured for the UE by higher-layer signaling such as RRC signaling, and an index is assigned to each RS pattern. The number of RSs may be signaled to the UE by DCI, and the UE may measure CSI by using as many RS resources as the number of RSs starting from a minimum index (e.g., 1).

C. Signaling of Only Multiple/Single RS Indicator:

A plurality of RS patterns may be configured for the UE by higher-layer signaling such as RRC signaling, and the eNB may indicate by a multiple/single RS indicator whether all of RSs configured at a corresponding time or one RS configured by the eNB is to be used. A corresponding RS configuration may be configured for the UE by other DCI content, or CSI may be measured by using a beam index for data transmission or an RS corresponding to the beam index.

2. RS for CSI Indication

A. Bitmap:

An RS set corresponding to each bit of a bitmap is configured, and the eNB may transmit, to the UE, a bitmap in which a bit corresponding to an RS set to be transmitted is set to 1. The UE may read the bitmap, and measure RSs corresponding to the bit set to 1. B. RS Index Indication B. RS Index Indication:

The eNB configures a plurality of RS patterns for the UE by higher-layer signaling such as RRC signaling, and indexes the RS patterns. The eNB may signal an RS index to the UE by DCI, and the UE may measure an RS corresponding to the RS index.

C. Signaling of Only Multiple/Single RS Indicator:

A plurality of RS patterns may be configured for the UE by higher-layer signaling such as RRC signaling, and the eNB may indicate by a multiple/single RS indicator whether all of RSs configured at a corresponding time or one RS configured by the eNB is to be used. A corresponding RS configuration may be configured for the UE by other DCI content, or CSI may be measured by using a beam index for data transmission or an RS corresponding to the beam index.

3. RBs for RS Transmission (if Narrow Band RS is Used)

A. Starting RB-Ending RB:

The eNB may index RBs, and indicate the RB index of a starting RS, and the RB index of an ending RS or an RB length to the UE. The eNB may indicate RB indexes directly to the UE, or may index starting RB-ending RB pair sets and indicate a corresponding index to the UE.

B. RB Bitmap:

An RB corresponding to each bit of a bitmap may be configured, and the eNB may transmit a bitmap with a bit corresponding to an RB carrying RSs set to 1. The UE may read the bitmap, and measure RSs in the RB corresponding to the bit set to 1. Herein, a narrow band may be configured instead of an RB.

C. Narrow band Index: the eNB may index respective narrow bands, and indicate an index corresponding to a narrow band carrying RSs to the UE.

4. RS Transmission Instance

A. With the reception time of DCI used as a reference, timings at which RSs configured according to the above method 1 to method 3 are to be transmitted may be indicated to the UE.

B. Particularly, it may be indicated that RSs having the same resource configuration are transmitted in a plurality of subframes. This may be used in a situation such as the stage of beam acquisition and CSI acquisition: ⑤ wideband RS and subband CSI (transmitted in a plurality of subframes with different beamformed RSs at different timings). This may be used in a situation in which the eNB shows more ports than the number of TXUs to the UE, like class B of FD-MIMO, or in a situation in which RSs for a plurality of analog beams are to be shown to the UE.

Herein, a CSI-RS transmission timing m from a CSI stage trigger for a plurality of CSI-RSs may be defined as follows.

A fixed timing m may be predefined.

The fixed timing m may be included in a CSI process, a stage configuration, or an RS configuration.

A range of m may be predetermined. An m value within the range may be indicated to the UE by the CSI stage trigger.

Figure 6:
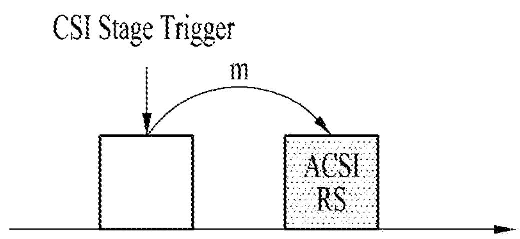
FIGS. 6, 7, 8, 9, 10, 11, 12, and 13 illustrate intervals between CSI stage triggers and aperiodic CSI-RS transmissions.

The range of m may be included in the CSI process, the stage configuration, or the RS configuration. An m value within the range may be indicated to the UE by the CSI stage trigger.

m may have the following meaning.

m is the interval (or distance) between a CSI stage trigger and an A-CSI-RS, which is illustrated in FIG. 6.

Figure 7:
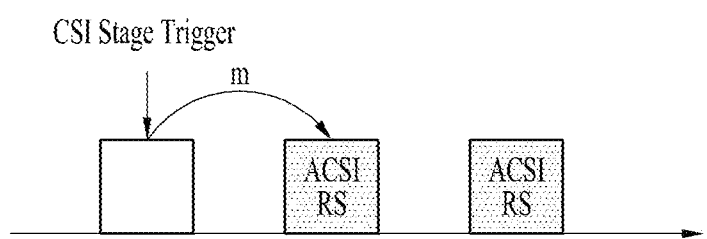

If a plurality of A-CSI-RSs are transmitted, m may have the following meaning.

m is the interval (or distance) between a CSI stage trigger and a first A-CSI-RS, which is illustrated in FIG. 7.

Figure 8:
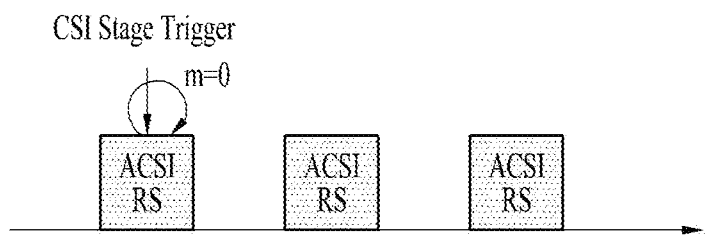
Figure 9:
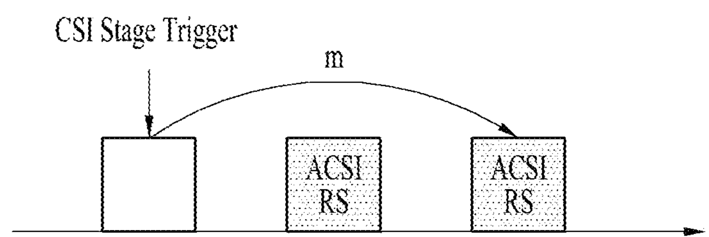

Particularly, the first A-CSI-RS may be transmitted in the same subframe as DCI including a corresponding indication. This case is identical to a case in which m is predefined as a fixed value, m=0. FIG. 8 illustrates the case in which m=0.

m is the interval (or distance) between a CSI stage trigger and a last A-CSI-RS, which is illustrated in FIG. 9.

As seen from this case, if an A-CSI-RS is not transmitted in the same subframe as the CSI stage trigger, an $i^{th}$ timing out of total M A-CSI-RS timings is an $(m/M*i)^{th}$ subframe (i=1, 2, 3, . . . ).

Particularly, if A-CSI-RSs having different usages/properties (e.g., A-CSI-RS for channel measurement and A-CSI-RS for interference measurement) are used for one CSI, and an aperiodic CSI reporting time is set with respect to a related RS timing, it is favorable to set an A-CSI-RS transmitting time as the timing of the last transmitted one among the different A-CSI-RSs, in order to secure a time for CSI calculation.

Figure 10:
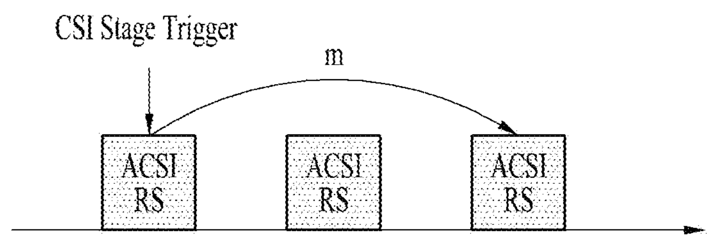

Or, if an A-CSI-RS and a CSI stage trigger are transmitted in the same subframe, an $i^{th}$ timing out of total M A-CSI-RS timings is an $(m/(M-1)*i)^{th}$ subframe (i=1, 2, 3, . . . ). FIG. 10 illustrates an example of transmitting a CSI stage trigger and an A-CSI-RS in the same subframe. Herein, it may be defined that m<0. In this case, a pre-transmitted A-CSI-RS may be indicated to the UE by the CSI stage trigger after the corresponding A-CSI-RS is transmitted.

Further, if a plurality of A-CSI-RSs are transmitted, a transmission timing period p of the A-CSI-RSs may be indicated as follows.

if m is the interval between a CSI stage trigger and a first CSI-RS, p=m without any further configuration.

A fixed timing p may be predefined.

The fixed timing p may be included in a CSI process, a stage configuration, or an RS configuration.

A range of p may be predetermined. A p value within the range may be indicated by the CSI stage trigger.

The range of p may be included in the CSI process, the stage configuration, or the RS configuration. A p value within the range may be indicated by the CSI stage trigger.

Particularly, if CSI-RSs are transmitted contiguously, this case corresponds to the case in which the fixed p value is predefined as p=1.

If a plurality of A-CSI-RSs are transmitted, p may mean the following.

The number of subframes between A-CSI-RSs.

Figure 11:
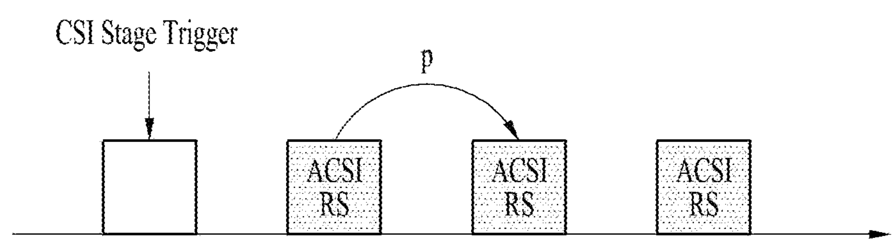

FIG. 11 illustrates p indicating the interval between A-CSI-RSs.

Subframes between a first A-CSI-RS and a last A-CSI-RS

Figure 12:
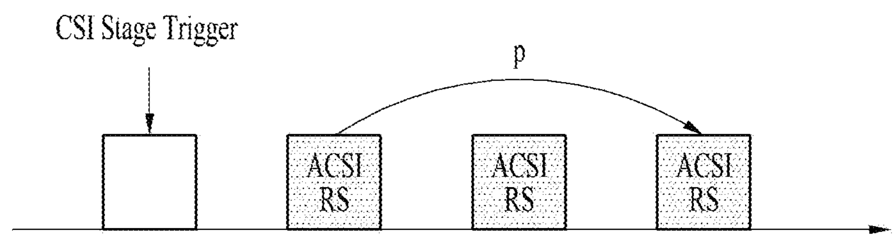

FIG. 12 illustrates p indicating the interval between a first A-CSI-RS and a last A-CSI-RS.

In this case, an $i^{th}$ timing out of total M A-CSI-RS timings may be a ((the transmission timing of a first A-CSI-RS)+p/(M−1)*(i−1))$^{th}$ subframe (i=1, 2, . . . ).

Subframes between the CSI stage trigger and the last A-CSI-RS.

Figure 13:
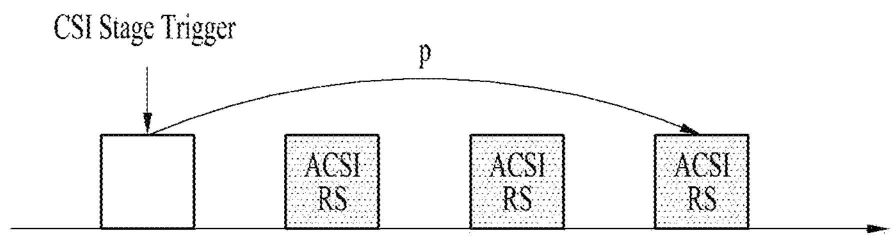

FIG. 13 illustrates p indicating the interval between a CSI stage trigger and a last A-CSI-RS. In this case, an $i^{th}$ timing out of total M A-CSI-RS timings may be a (p/M*i)$^{th}$ subframe (i=1, 2, . . . ).

In the above methods, if A-CSI-RSs having different usages/properties (e.g., A-CSI-RS for channel measurement and A-CSI-RS for interference measurement) are used in deriving one CSI, and the timing of aperiodic CSI reporting is set with respect to a related RS timing, the transmission timings of A-CSI-RSs may be set by using different RS timing indication methods among the above RS timing indication methods. Particularly, if two A-CSI-RSs are used, the earlier RS is transmitted at the time of a CSI stage trigger and thus it is understood that m=0 for the earlier RS, and only the timing of the later RS may be transmitted.

5. UL Resources Used for CSI Feedback

A. PUSCH Resource Allocation i. Indication of non-scheduled resources (e.g., a PUCCH) may be considered.

B. Reporting Timing Indication

With respect to the reception time of corresponding DCI, a timing at which UL resources are configured for CSI reporting may be indicated to the UE.

As such, if A-CSI-RSs for one or more CSI-RSs are transmitted and thus a CSI stage trigger for the corresponding RSs is transmitted to the UE by the eNB, the eNB may set a CSI feedback timing k at which the UE is supposed to report aperiodic CSI for the CSI stage trigger in the following method.

A fixed timing k may be predefined.

The fixed timing k may be included in a CSI process, a stage configuration, or an RS configuration.

A range of k may be predetermined. A k value within the range may be indicated to the UE by a CSI stage trigger.

The range of k may be included in the CSI process, the stage configuration, or the RS configuration. A k value within the range may be indicated to the UE by the CSI stage trigger.

Figure 14:
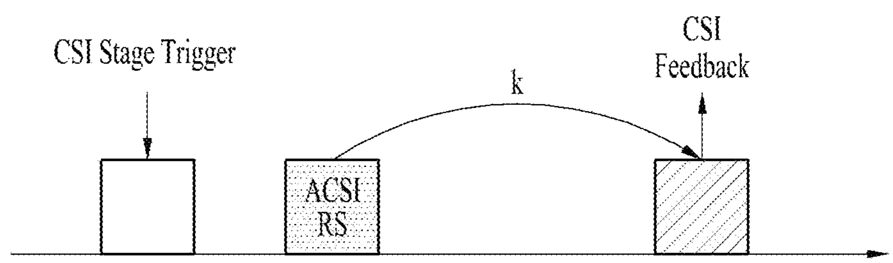
FIGS. 14, 15, 16, 17, and 18 illustrate intervals between CSI stage triggers and CSI feedbacks.

The above k value may mean the following.

k is the interval (or distance) distance between an A-CSI-RS and a CSI feedback time, which is illustrated in FIG. 14.

Figure 15:
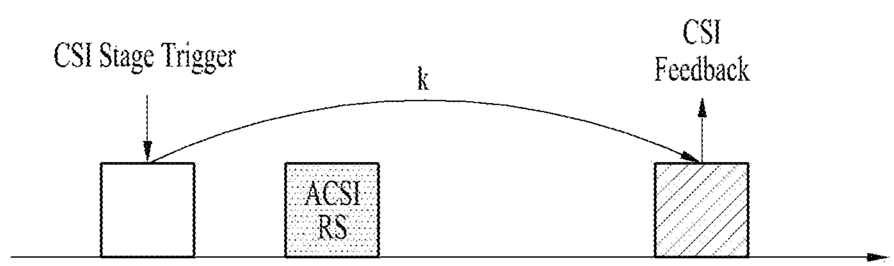

Since aperiodic CSI is calculated after reception of an A-CSI-RS, this scheme is appropriate for securing a time to calculate the aperiodic CSI.

k is the interval (or distance) between a CSI stage trigger and a CSI feedback time, which is illustrated in FIG. 15.

Figure 16:
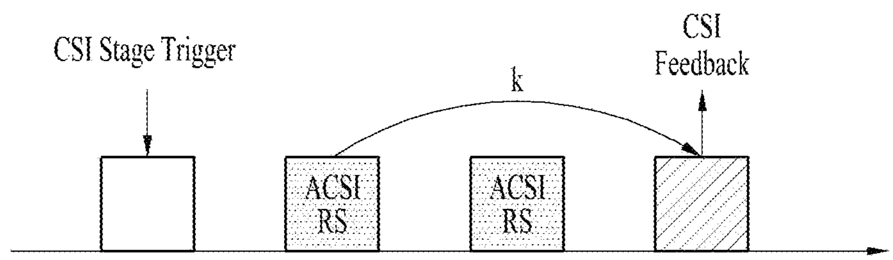

If a plurality of A-CSI-RSs are transmitted, the above k value may mean the following.

k is the interval (or distance) from a first A-CSI-RS, which is illustrated in FIG. 16.

Figure 17:
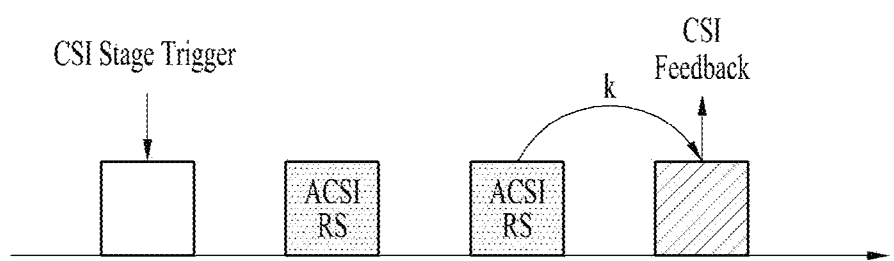

Although specific A-CSI-RSs for aperiodic CSI calculation are transmitted at a plurality of time points, if a CSI stage trigger is received before the transmission of the plurality of A-CSI-RSs does not start, it is effective to indicate a CSI feedback time as a timing from the transmission time of the first A-CSI-RS.

k is the interval (or distance) between a last A-CSI-RS and a CSI feedback time, which is illustrated in FIG. 17.

Particularly, if A-CSI-RSs having different usages/properties (e.g., A-CSI-RS for channel measurement and A-CSI-RS for interference measurement) are used for one CSI, and an aperiodic CSI reporting time is set with respect to a related RS timing, it is favorable to set an A-CSI-RS transmitting time as the timing of the last transmitted one among the different A-CSI-RSs, in order to secure a time for CSI calculation.

In other words, the case where a plurality of aperiodic RSs are used in calculating aperiodic CSI (e.g., A-CSI-RS for channel measurement and aperiodic CSI-IM for interference measurement) is an appropriate example of the above method. In this case, it is appropriate to set k as a distance from the last transmitted one of a plurality of RSs. Due to the difficulty of dynamic alignment with different transmission and reception points (TRPs), there may be a mismatch between the transmission time of an NZP-CSI-RS for measurement of inter-cell interference and the transmission time of an A-CSI-RS for channel measurement. Particularly, the mismatch becomes obvious between two TRPs using different UL/DL configurations.

More specifically, let the time of receiving a CSI stage trigger (similarly, an aperiodic CSI trigger) triggering aperiodic CSI reporting at the UE be denoted by n, and let the time of transmitting an $i^{th}$ RS among CSI-RSs (including NZP-CSI-RS for channel measurement and CSI-IM for interference measurement (e.g., NZP-CSI-RS and ZP-CSI-RS)) with respect to the time n be denoted by $m_i$. Then, an aperiodic CSI reporting time may be $n+\max(m_i,0)+k$. In $\max(m_i,0)$, '0' is an example including a later-described case that 'k is the distance from a CSI stage trigger', which may be used in a situation where if an A-CSI-RS (or A-CSI-IM) is transmitted before the CSI stage trigger time, a CSI calculation time is to be indicated with respect to the reception time of the corresponding signaling.

Figure 18:
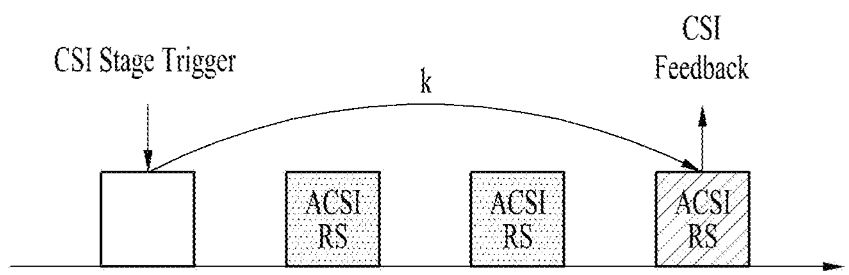

Each $m_i$ as mentioned above may be understood differently in different A-CSI-RS transmissions schemes (e.g., one-shot A-CSI-RS or plural A-CSI-RSs). For example, $m_i$ may mean an interval (or distance) from a corresponding A-CSI-RS, in the case of one-shot A-CSI-RS transmission, whereas $m_i$ may mean an interval (or distance) from the transmission time of a last RS, in the case of transmission of a plurality of A-CSI-RSs. Particularly, if the UE receives the above CSI stage trigger before the transmission of the plurality of A-CSI-RSs starts, $m_i$ may mean a timing with respect to a first RS, and if the UE receives the above CSI stage trigger after the transmission of the plurality of A-CSI-RSs ends, $m_i$ may mean a timing with respect to a last RS.

k is the interval (or distance) between a CSI stage trigger and a CSI feedback time, which is illustrated in FIG. 18.

ii. If the measurement result of one RS is too large, the UE may report the measurement result separately across a plurality of subframes.

An aperiodic CSI reporting timing period q may be indicated as follows in a CSI stage trigger for a plurality of A-CSI-RSs.

A fixed timing q may be predefined.

The fixed timing q may be included in a CSI process, a stage configuration, or an RS configuration.

A range of m may be predetermined. A q value within the range may be indicated to the UE by a CSI stage trigger.

The range of m may be included in the CSI process, the stage configuration, or the RS configuration. A q value within the range may be indicated to the UE by the CSI stage trigger.

q may have the following meanings.

Figure 19:
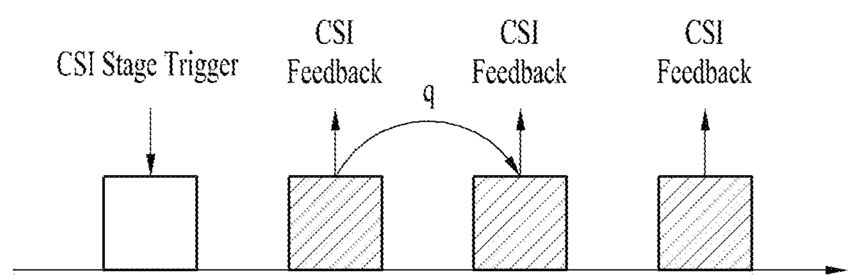
FIGS. 19, 20, and 21 illustrate intervals among CSI stage triggers, aperiodic CSI-RS transmissions, and CSI feedbacks.

An interval (or distance) between a CSI stage trigger and aperiodic CSI reporting, which is illustrated in FIG. 19.

Figure 20:
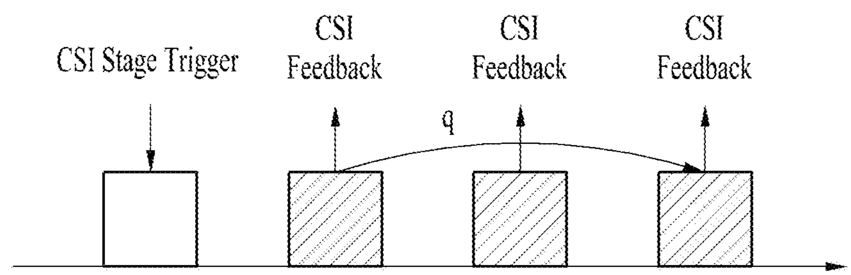

An interval (or distance) between first aperiodic CSI reporting and last aperiodic CSI reporting, which is illustrated in FIG. 20.

Figure 21:
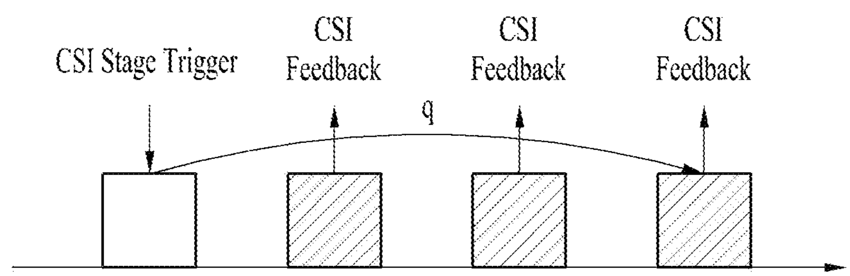

An interval (or distance) between a CSI stage trigger and last aperiodic CSI reporting, which is illustrated in FIG. 21.

Or if an operation of transmitting RSs in a plurality of subframes is indicated by corresponding DCI, the UE may report CSI for each of the RSs. In this case, q=p.

iii. The same UL resource allocation may be applied to each reporting timing.

That is, the UE may calculate CSI by measuring an RS indicated by DCI, and report the CSI in UL resources (time and frequency) indicated by the DCI.

According to another embodiment of the present disclosure, a CSI stage including only CSI-RS transmission without CSI reporting may also be defined. For example, a CSI-RS which does not require CSI reporting may be transmitted, such as a CSI-RS for UE-side beam adjustment. In this case, the UE may configure its transmission and/or reception beam in a corresponding CSI stage by using a CSI-RS transmitted by the eNB, without the need for transmitting a beam management-related report like a CRI. Further, a CSI stage for configuring an RS transmission for use in CSI calculation at a different time point may be defined. For example, separately from a CSI stage including an NZP CSI-RS-based IMR for inter-TRP interference measurement, and CSI reporting, in order to calculate/report CSI based on a CSI-IM to be transmitted later at a different time point, for example, an NZP CSI-RS-based IMR for inter-TRP interference measurement, difficult to be aligned with the transmission timing of a CSI-RS transmitted in its cell due to transmission at a different TRP, only a CSI-RS may be transmitted preliminarily. On the contrary, in order to calculate CSI by using an NZP CSI-RS-based IMR from another TRP, transmitted at a specific time, and an NZP CSI-RS to be transmitted later at a different time point, transmission of an NZP CSI-RS-based IMR for inter-TRP interference measurement may be indicated to the UE, separately from a CSI stage including an NZP CSI-RS and CSI reporting.

In a CSI stage in which an RS is transmitted irrespective of CSI reporting, it may be configured that the UE is to buffer the result of measuring the RS, for use in a next operation (e.g., CSI calculation). In one method, in the case of a CSI stage which does not include a CSI reporting configuration, the corresponding RS measurement result may be automatically buffered until it is used in a next operation. In this case, the corresponding RS may be used in the next CSI stage reporting, or reporting in a CSI stage including a configuration indicating 'a configuration for an RS for other CSI stage'.

Or/and, if an RS included in a CSI stage without a CSI reporting configuration is to be used in CSI reporting included in another CSI stage, 'inter-CSI-stage reporting' may be configured in the corresponding CSI stage, to be distinguished from a scheme such as UE beam adjustment without the need for CSI reporting, and may be included in the reporting configuration of the corresponding CSI stage. In the presence of an RS which has been transmitted at a previous time point but has not been used in CSI reporting at a specific CSI reporting starting time (e.g., an RS measurement time, or a CSI calculation starting time) (and also in the case where a subsequent RS valid period has been defined and has not elapsed), the above operation may be understood as adding the RS to the CSI stage. The usage of the RS (e.g., CSI-RS or CSI-IM) may be configured along with a resource configuration, particularly 'inter-CSI-stage reporting'.

Further, to include a measurement result of an RS transmitted in another CSI stage in CSI calculation, the corresponding CSI stage may not include an RS configuration. Or to make this operation clear, 'inter-CSI-stage RS' may be configured, which may be included in the RS configuration of the CSI stage. In this case, in the presence of an RS which has not been reported previously, CSI based on RSs including the corresponding RS may be reported. In the absence of the RS, CSI based on only an RS included in a current CSI stage may be reported or the corresponding reporting may be omitted. If the dependency between CSI stages is not limited simply by a previous RS transmission, CSI reporting of the corresponding CSI stage may be performed using a measurement of an additional RS which is later transmitted in another CSI stage.

In the above case, an 'RS valid period' may be defined, and thus a time at which the foregoing RS measurement result may be used for CSI reporting (of another CSI stage) through buffering may be indicated to the UE. The RS valid period may be predefined or included in a corresponding RS configuration/CSI stage configuration. If the RS valid period expires, it may be considered that there is no previous RS measurement result. Further, if the corresponding CSI stage includes a 'inter-CSI-stage RS' configuration, CSI based on only an RS included in the corresponding stage may be reported, or the corresponding CSI reporting may be omitted. Particularly, the value or a range of available values may be defined differently according to the purpose of the RS (e.g., beam management or CSI reporting).

As described before, if there is inter-CSI-stage dependency, the foregoing CSI reporting timing may be defined with respect to a CSI stage corresponding to the last transmitted RS. For example, the CSI reporting timing may be defined with respect to the transmission/reception timing of the last transmitted RS. Further, rather than an RS transmitted in another CSI stage is configured separately in a CSI stage used for actual CSI calculation, it may be considered that CSI is calculated based on RSs including the previous transmitted RS in a CSI stage triggered by DCI transmitted at the transmission timing of the RS. That is, if CSI stage #1 includes only an RS configuration without CSI reporting, and CSI stage #2 includes only a reporting configuration without any RS configuration, an RS may be transmitted in an RS transmission instance set by CSI stage #1, and at the same time, DCI triggering CSI stage #2 may be transmitted in a corresponding slot. In this case, regarding CSI reporting in CSI stage #2, CSI may be calculated/reported by using the RS transmitted simultaneously at the transmission timing of the DCI. In this case, the DCI triggering CSI stage #1 may be DL-related DCI. In addition, the 'RS transmission instance' indicated by CSI stage #1 may be a transmission instance of DCI indicating (CSI reporting of) a CSI stage in which the corresponding RS may be used at the same time.

A CSI stage as mentioned in the present disclosure may be interpreted as similar to a 'measurement configuration' discussed in NR MIMO. For example, one RS-report set configured to link separately configured 'resource configuration' and 'reporting configuration' in the 'measurement configuration' may be understood as similar to the concept of a CSI stage in the present disclosure. Additionally, for more flexibility, the linkage between a resource configuration and a reporting configuration may also be implemented by MAC signaling.

An RS resource indication field may be defined in DCI, and may be interpreted differently according to the CSI stage indication. For example, an 8-bit RS resource indication field is defined. If CSI stage trigger=01 (i.e., multiple RS mode), the RS resource indication field may be interpreted as a bitmap indicating an RS configuration to be used from among RRC-configured 8 types of RS configurations. If CSI stage trigger=10 (i.e., single RS mode), the RS resource indication field may be interpreted as indicating one of RRC-configured 64 RS patterns (2 bits are reserved). If CSI stage trigger=11 (i.e., partial band RS mode), the RS resource indication field may be interpreted as indicating one of RRC-configured 64 RS patterns and one of four partial bands.

Instead of the CSI stage trigger, a 1-bit CSI trigger may be configured, and an expiration timer may be configured for each stage (i.e., an RS-feedback type pair), so that at each aperiodic RS indication/aperiodic CSI request timing, a stage for which RS measurement/feedback is to be performed may be selected according to whether a corresponding expiration timer value has elapsed. For example, in an environment where a total of two stages are defined and an expiration timer for stage I is set to 5 ms, if measurement/feedback for stage I is performed at a specific time point, the expiration timer for stage I may be reset (e.g., timer=5). Then, until before the expiration timer expires (e.g., timer=0), all of CSI triggers received at the UE may be regarded as meant for stage II. Subsequently, after the expiration of the expiration timer, the first received CSI trigger may be interpreted as triggering stage I.

If the UE fails to receive a CSI stage trigger/CSI trigger from the eNB, the eNB may determine whether the CSI stage trigger/CSI trigger has been received by checking in which UL resources a CSI feedback is received/not received. In this case, the eNB may not transmit a plurality of CSI stage triggers/CSI triggers for a predetermined time (e.g., 4 ms) (particularly, when the stage using the above expiration timer is triggered), and the UE may expect that two or more CSI stage triggers/CSI triggers will not be received for the predetermined time (e.g., 4 ms).

Or if the UE receives two or more CSI stage triggers/CSI triggers for the predetermined time (e.g., 4 ms), the UE may report only a feedback for the first CSI stage trigger/CSI trigger.

A CSI-RS as mentioned in the present disclosure is an RS used for calculating CSI. The CSI-RS includes NZP-CSI-RS for channel measurement, and NZP-CSI-RS and/or CSI-IS for interference measurement, that is, CSI-IM. Further, as described before, it is apparent that if different RSs are indicated in an RS configuration, the CSI-RS may be replaced with a different type of RS (e.g., BRS, BRRS, RRM-RS, or DMRS) according to a configuration, for CSI calculation.

In order to transmit a 'stage index' by DCI, instead of independent transmission of each piece of information in DCI, each stage may be configured by L3 signaling such as an RRC configuration. This configuration may include the whole or part of the above-described content.

Or for more flexibility, L2 signaling such as MAC signaling may be used. Herein, a range which can be selected by each piece of content may be limited in order to reduce the overhead of MAC signaling. For example, available RE pattern candidates may be configured by RRC signaling, and a pattern to be used actually may be configured for each CSI stage by L2 signaling.

Figure 22:
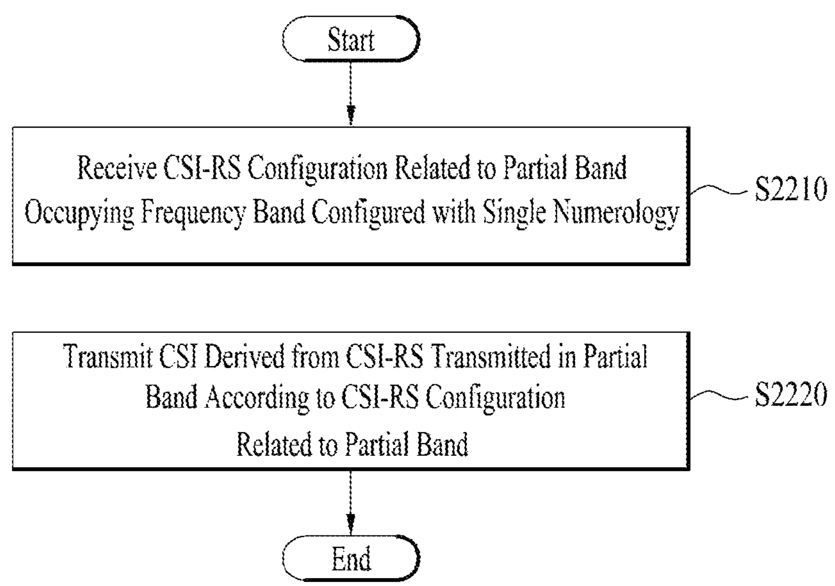
FIG. 22 illustrates an operation of a UE according to an embodiment of the present disclosure.

FIG. 22 illustrates an operation according to an embodiment of the present disclosure.

FIG. 22 relates to a method for reporting a channel state based on a CSI-RS in a wireless communication system. The method is performed by a UE.

The UE may receive a CSI-RS configuration related to a partial band occupying a frequency band for which a single numerology is configured (S2210). The CSI-RS configuration related to the partial band may be received by higher-layer signaling. If the CSI-RS configuration includes CSI-RS configurations for a plurality of partial bands, different numerologies may be configured for the plurality of partial bands. The UE may transmit CSI derived from a CSI-RS transmitted in the partial band, according to the CSI-RS configuration related to the partial band (S2220).

The CSI-RS configuration related to the partial band may include information about a bandwidth or a frequency position. Further, each of the plurality of partial bands may be a frequency band in which one transport block is transmitted. At least a part of the plurality of partial bands may be time-division multiplexed.

If the CSI-RS configuration includes the CSI-RS configurations for the plurality of partial bands, at least a part of the plurality of partial bands may overlap with each other.

The transmitted CSI may include CSI independently derived from each of the plurality of partial bands.

While the embodiments of the present disclosure have been described above briefly with reference to FIG. 22, the embodiment related to FIG. 22 may alternatively or additionally include at least a part of the foregoing embodiment(s).

Figure 23:
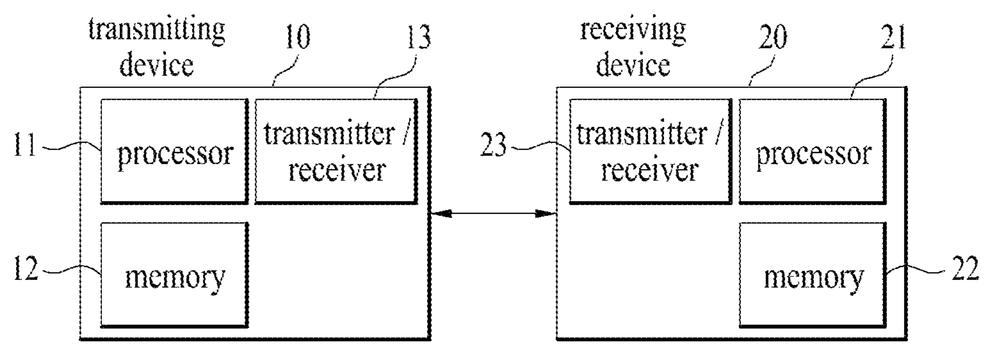
FIG. 23 is a block diagram of apparatuses for implementing the embodiment(s) of the present disclosure.

FIG. 23 is a block diagram of a transmitting device 10 and a receiving device 20 configured to implement exemplary embodiments of the present invention. Referring to FIG. 23, the transmitting device 10 and the receiving device 20 respectively include transmitter/receiver 13 and 23 for transmitting and receiving radio signals carrying information, data, signals, and/or messages, memories 12 and 22 for storing information related to communication in a wireless communication system, and processors 11 and 21 connected operationally to the transmitter/receiver 13 and 23 and the memories 12 and 22 and configured to control the memories 12 and 22 and/or the transmitter/receiver 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the transmitter/receiver 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the transmitter/receiver 13 may include an oscillator. The transmitter/receiver 13 may include Nt (where Nt is a positive integer) transmit antennas.

A signal processing process of the receiving device 20 is the reverse of the signal processing process of the transmitting device 10. Under the control of the processor 21, the transmitter/receiver 23 of the receiving device 10 receives RF signals transmitted by the transmitting device 10. The transmitter/receiver 23 may include Nr receive antennas and frequency down-converts each signal received through receive antennas into a baseband signal. The transmitter/receiver 23 may include an oscillator for frequency down-conversion. The processor 21 decodes and demodulates the radio signals received through the receive antennas and restores data that the transmitting device 10 wishes to transmit.

The transmitter/receiver 13 and 23 include one or more antennas. An antenna performs a function of transmitting signals processed by the transmitter/receiver 13 and 23 to the exterior or receiving radio signals from the exterior to transfer the radio signals to the transmitter/receiver 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An transmitter/receiver supporting a MIMO function of transmitting and receiving data using a plurality of antennas may be connected to two or more antennas.

The transmitting device and/or the receiving device may be configured as a combination of one or more embodiments of the present invention.

The embodiments of the present application has been illustrated based on a wireless communication system, specifically 3GPP LTE (-A), however, the embodiments of the present application can be applied to any wireless communication system in which interferences exist.

It will be apparent to those skilled in the art that various modifications and variations can be made in the present invention without departing from the scope of the inventions. Thus, it is intended that the present invention covers the modifications and variations of this invention provided they come within the scope of the appended claims and their equivalents.

INDUSTRIAL APPLICABILITY

The present invention is applicable to wireless communication devices such as a terminal, a relay, and a base station.

The invention claimed is:

1. A method for reporting channel state information (CSI) based on a CSI-reference signal (CSI-RS) in a wireless communication system, the method comprising:

receiving a plurality of CSI configurations from a single network node, wherein each of the plurality of CSI configurations includes information regarding (i) a period and (ii) a measurement resource;

receiving a trigger signal for the plurality of CSI configurations to determine, among the plurality of CSI configurations, a first CSI configuration including information regarding (i) a first period and (ii) a first measurement resource, wherein the trigger signal includes a stage index indicating one of (i) no trigger, (ii) a digital beam selection, (iii) a partial band selection, or (iv) a CSI tracking;

receiving the CSI-RS on the first measurement resource; and transmitting a CSI report for the first measurement resource with the first period, according to the first CSI configuration determined based on the trigger signal not having the stage index indicating (i) no trigger, wherein the CSI report includes information based on the stage index of the trigger signal.

2. The method according to claim 1, wherein the CSI report is transmitted with the first period on the same uplink resource.

3. The method according to claim 1, wherein the CSI report is transmitted on a physical uplink control channel.

4. The method according to claim 1, wherein each of the CSI configurations is related to a partial band occupying a frequency band configured with a single numerology, and includes information about a bandwidth or a frequency position.

5. The method according to claim 1, wherein each of the CSI configurations includes configurations for a plurality of partial bands, and each of the plurality of partial bands is a frequency band in which one transport block is transmitted.

6. The method according to claim 1, wherein, based on the first CSI configuration including configurations for a plurality of partial bands, at least a part of the plurality of partial bands overlaps with each other.

7. The method according to claim 6, wherein the at least part of the plurality of partial bands is time-division multiplexed.

8. The method according to claim 6, wherein the transmitted CSI report includes CSI derived independently from each of the plurality of partial bands related to the CSI report.

9. The method according to claim 1, wherein each of the CSI-RS configurations related to a partial band related to the CSI report is received by higher-layer signaling.

10. A terminal configured to report channel state information (CSI) based on a CSI-reference signal (CSI-RS) in a wireless communication system, the terminal comprising:

a transmitter and a receiver;

at least one processor; and at least one computer memory operably connectable to the at least one processor and storing instructions that, when executed by the at least one processor, perform operations comprising:

receiving, through the receiver, a plurality of CSI configurations from a single network node, wherein each of the plurality of CSI configuration includes information regarding (i) a period and (ii) a measurement resource;

receiving, through the receiver, a trigger signal for the plurality of CSI configurations to determine, among the plurality of CSI configurations, a first CSI configuration including information regarding (i) a first period and (ii) a first measurement resource, wherein the trigger signal includes a stage index indicating one of (i) no trigger, (ii) a digital beam selection, (iii) a partial band selection, or (iv) a CSI tracking;

receiving, through the receiver, the CSI-RS on the first measurement resource; and transmitting, through the transmitter, a CSI report for the first measurement resource with the first period, according to the first CSI configuration determined based on the trigger signal not having the stage index indicating (i) no trigger, wherein the CSI report includes information based on the stage index of the trigger signal.

11. The terminal according to claim 10, wherein the CSI report is transmitted with the first period on the same uplink resource.

12. The terminal according to claim 10, wherein the CSI report is transmitted on a physical uplink control channel.

13. The terminal according to claim 10, wherein each of the CSI configurations is related to a partial band occupying a frequency band configured with a single numerology, and includes information about a bandwidth or a frequency position.

14. The terminal according to claim 10, wherein each of the CSI configurations includes configurations for a plurality of partial bands, and each of the plurality of partial bands is a frequency band in which one transport block is transmitted.

15. The terminal according to claim 10, wherein, based on the first CSI configuration including configurations for a plurality of partial bands, at least a part of the plurality of partial bands overlap with each other.

16. The terminal according to claim 15, wherein the at least part of the plurality of partial bands is time-division multiplexed.

17. The terminal according to claim 15, wherein the transmitted CSI report includes CSI derived independently from each of the plurality of partial bands related to the CSI report.

18. The terminal according to claim 10, wherein each of the CSI-RS configurations related to a partial band related to the CSI report is received by higher-layer signaling.

* * * * *